US 11,291,927 B2

(12) United States Patent
Crawford et al.

(10) Patent No.: US 11,291,927 B2
(45) Date of Patent: Apr. 5, 2022

(54) METHODS AND SYSTEMS FOR ELECTRIFYING, DECARBONIZING, AND REDUCING ENERGY DEMAND AND PROCESS CARBON INTENSITY IN INDUSTRIAL PROCESSES VIA INTEGRATED VAPOR COMPRESSION

(71) Applicant: Energy Integration, Inc., Boulder, CO (US)

(72) Inventors: Lynn Allen Crawford, Aurora, CO (US); William Bryan Schafer, III, Boulder, CO (US)

(73) Assignee: Energy Integration, Inc., Boulder, CO (US)

( * ) Notice: Subject to any disclaimer, the term of this patent is extended or adjusted under 35 U.S.C. 154(b) by 0 days.

(21) Appl. No.: 17/374,959

(22) Filed: Jul. 13, 2021

(65) Prior Publication Data

US 2022/0016543 A1    Jan. 20, 2022

Related U.S. Application Data

(60) Provisional application No. 63/172,151, filed on Apr. 8, 2021, provisional application No. 63/172,150, filed
(Continued)

(51) Int. Cl.
*B01D 1/26* (2006.01)
*B01D 1/28* (2006.01)
(Continued)

(52) U.S. Cl.
CPC ......... *B01D 1/2887* (2013.01); *B01D 1/0058* (2013.01); *B01D 1/26* (2013.01);
(Continued)

(58) Field of Classification Search
CPC ...... B01D 1/0058; B01D 1/26; B01D 1/2887; B01D 3/007; B01D 3/14; Y02E 20/30
See application file for complete search history.

(56) References Cited

U.S. PATENT DOCUMENTS

| 4,284,480 A | * | 8/1981 | Sterlini | B01D 1/26 159/47.1 |
| 4,340,446 A | * | 7/1982 | Crawford | B01D 3/148 203/19 |

(Continued)

FOREIGN PATENT DOCUMENTS

WO    2017192515 A1    11/2017

OTHER PUBLICATIONS

International Search Report and Written Opinion, WO2022015776 (PCT/US2021/041504), "Methods and Systems for Electrifying, Decarbonizing, and Reducing Energy Demand and Process Carbon Intensity in Industrial Processes Via Integrated Vapor Compression".

*Primary Examiner* — Jonathan Miller
(74) *Attorney, Agent, or Firm* — O'Connor & Company; Ryan P. O'Connor

(57) ABSTRACT

This disclosure provides systems and methods that utilize integrated mechanical vapor or thermal vapor compression to upgrade process vapors and condense them to recover the heat of condensation across multiple processes, wherein the total process energy is reduced. Existing processes that are unable to recover the heat of condensation in vapors are integrated with mechanical or thermal compressors that raise vapor pressures and temperatures sufficient to permit reuse. Integrating multiple processes permits vapor upgrading that can selectively optimize energy efficiency, environmental sustainability, process economics, or a prioritized blend of such goals. Mechanical or thermal vapor compression also alters the type of energy required in industrial processes,
(Continued)

favoring electro-mechanical energy which can be supplied from low-carbon, renewable sources rather than combustion of carbonaceous fuels.

18 Claims, 4 Drawing Sheets

Related U.S. Application Data on Apr. 8, 2021, provisional application No. 63/052,202, filed on Jul. 15, 2020.

(51) Int. Cl.

| | | |
|---|---|---|
| B01D 3/14 | (2006.01) | |
| B01D 3/00 | (2006.01) | |
| B01D 1/00 | (2006.01) | |
| B01D 9/00 | (2006.01) | |
| C07B 31/00 | (2006.01) | |
| C07B 33/00 | (2006.01) | |
| C07B 35/02 | (2006.01) | |
| C07B 35/04 | (2006.01) | |
| C07B 35/08 | (2006.01) | |
| C07B 37/08 | (2006.01) | |
| C07B 37/10 | (2006.01) | |
| C10B 55/00 | (2006.01) | |
| C10G 7/00 | (2006.01) | |
| C10G 9/00 | (2006.01) | |
| C10G 11/00 | (2006.01) | |
| C10G 31/06 | (2006.01) | |
| C10G 45/00 | (2006.01) | |
| C10G 47/00 | (2006.01) | |
| C10G 49/00 | (2006.01) | |
| C10G 50/00 | (2006.01) | |
| C10G 51/00 | (2006.01) | |
| C10G 53/00 | (2006.01) | |
| C10G 55/00 | (2006.01) | |
| C10G 57/00 | (2006.01) | |
| C10G 59/00 | (2006.01) | |
| C10G 61/00 | (2006.01) | |
| C10G 63/00 | (2006.01) | |
| C10G 65/00 | (2006.01) | |
| C10G 67/00 | (2006.01) | |
| C10G 69/00 | (2006.01) | |

(52) U.S. Cl.
 CPC ......... *B01D 1/2884* (2013.01); *B01D 1/2896* (2013.01); *B01D 3/007* (2013.01); *B01D 3/14* (2013.01); *B01D 3/143* (2013.01); *B01D 9/00* (2013.01); *C07B 31/00* (2013.01); *C07B 33/00* (2013.01); *C07B 35/02* (2013.01); *C07B 35/04* (2013.01); *C07B 35/08* (2013.01); *C07B 37/08* (2013.01); *C07B 37/10* (2013.01); *C10B 55/00* (2013.01); *C10G 7/00* (2013.01); *C10G 9/00* (2013.01); *C10G 11/00* (2013.01); *C10G 31/06* (2013.01); *C10G 45/00* (2013.01); *C10G 47/00* (2013.01); *C10G 49/00* (2013.01); *C10G 50/00* (2013.01); *C10G 51/00* (2013.01); *C10G 53/00* (2013.01); *C10G 55/00* (2013.01); *C10G 57/00* (2013.01); *C10G 59/00* (2013.01); *C10G 61/00* (2013.01); *C10G 63/00* (2013.01); *C10G 65/00* (2013.01); *C10G 67/00* (2013.01); *C10G 69/00* (2013.01); *Y02E 20/30* (2013.01)

(56) References Cited

U.S. PATENT DOCUMENTS

| | | | |
|---|---|---|---|
| 4,422,903 A | 12/1983 | Messick et al. | |
| 4,536,258 A | 8/1985 | Huhta-Koivisto | |
| 4,539,076 A | 9/1985 | Swain | |
| 4,585,523 A | 4/1986 | Giddings | |
| 4,617,270 A | 10/1986 | Anderson et al. | |
| 4,645,569 A | 2/1987 | Akabane et al. | |
| 4,692,218 A | 9/1987 | Houben et al. | |
| 4,746,610 A * | 5/1988 | Smith | C12P 7/06 435/161 |
| 5,294,304 A | 3/1994 | Kano et al. | |
| 5,435,436 A * | 7/1995 | Manley | B01D 5/0045 202/172 |
| 5,772,850 A | 6/1998 | Morris | |
| 7,089,762 B2 * | 8/2006 | Chou | C02F 1/22 62/617 |
| 7,257,945 B2 | 8/2007 | Kass et al. | |
| 7,908,861 B2 * | 3/2011 | Chino | F01K 17/005 60/645 |
| 8,002,952 B2 * | 8/2011 | Sechrist | B01D 3/14 202/153 |
| 8,101,217 B2 | 1/2012 | Sovereign et al. | |
| 8,101,808 B2 | 1/2012 | Evanko et al. | |
| 8,114,255 B2 | 2/2012 | Vane et al. | |
| 8,128,787 B2 | 3/2012 | Wynn et al. | |
| 8,188,198 B2 * | 5/2012 | Van Der Schrick | C08F 10/00 526/88 |
| 8,283,505 B2 | 10/2012 | Evanko et al. | |
| 8,304,588 B2 | 11/2012 | Evanko et al. | |
| 8,614,077 B2 | 2/2013 | Evanko et al. | |
| 8,435,331 B2 | 5/2013 | Littleford | |
| 8,535,413 B2 | 11/2013 | Bryan et al. | |
| 9,034,629 B2 | 5/2015 | Skraly et al. | |
| 9,138,678 B2 | 9/2015 | Huang et al. | |
| 9,528,055 B2 * | 12/2016 | Noureldin | B01J 19/24 |
| 9,562,201 B2 * | 2/2017 | Noureldin | C10K 1/003 |
| 9,605,220 B2 * | 3/2017 | Noureldin | F01K 25/10 |
| 9,605,221 B2 * | 3/2017 | Noureldin | B01J 19/0006 |
| 9,816,401 B2 * | 11/2017 | Noureldin | F28D 21/0014 |
| 9,925,476 B2 * | 3/2018 | Crawford | B01D 3/001 |
| 9,925,477 B2 * | 3/2018 | Crawford | B01D 3/002 |
| 10,131,849 B2 * | 11/2018 | Prevost | B01D 3/007 |
| 10,480,354 B2 * | 11/2019 | Noureldin | B01D 3/146 |
| 10,486,081 B2 * | 11/2019 | Lee | B01D 1/28 |
| 10,688,407 B1 * | 6/2020 | Ernst | B01D 3/007 |
| 10,787,407 B2 * | 9/2020 | Crawford | C07C 29/80 |
| 10,835,836 B2 * | 11/2020 | Goldshtein | F01K 23/10 |
| 10,874,956 B2 * | 12/2020 | Andrade | B01D 3/007 |
| 10,947,486 B1 * | 3/2021 | Crawford | B01D 1/0058 |
| 11,034,638 B2 * | 6/2021 | Crawford | B01D 3/007 |
| 11,078,809 B2 * | 8/2021 | Noureldin | F25J 3/0238 |
| 2008/0168772 A1 * | 7/2008 | Radcliff | F01K 23/04 60/651 |
| 2013/0291808 A1 * | 11/2013 | Kautto | C10J 3/726 122/7 R |
| 2013/0337527 A1 | 12/2013 | Walther et al. | |
| 2014/0243435 A1 | 8/2014 | Blank et al. | |
| 2016/0002131 A1 * | 1/2016 | Glasspool | C07C 29/76 203/18 |
| 2017/0058203 A1 * | 3/2017 | Prevost | C10L 1/06 |
| 2017/0349451 A1 * | 12/2017 | Lockwood | C02F 1/441 |
| 2018/0028934 A1 * | 2/2018 | Crawford | B01D 3/002 |
| 2018/0237550 A1 | 8/2018 | Miyake et al. | |
| 2019/0048751 A1 * | 2/2019 | Noureldin | C10L 3/101 |
| 2019/0336882 A1 * | 11/2019 | Andrade | C07C 29/80 |

* cited by examiner

METHODS AND SYSTEMS FOR ELECTRIFYING, DECARBONIZING, AND REDUCING ENERGY DEMAND AND PROCESS CARBON INTENSITY IN INDUSTRIAL PROCESSES VIA INTEGRATED VAPOR COMPRESSION

PRIORITY DATA

This patent application is a non-provisional application claiming priority to U.S. Provisional Patent App. No. 63/052,202, filed on Jul. 15, 2020, and to U.S. Provisional Patent App. No. 63/172,150, filed on Apr. 8, 2021, and to U.S. Provisional Patent App. No. 63/172,151, filed on Apr. 8, 2021, each of which is hereby incorporated by reference herein.

FIELD OF THE INVENTION

The present invention generally relates to methods and systems for reducing carbon intensity associated with refineries and biorefineries.

BACKGROUND OF THE INVENTION

Refining processes raw materials that are composed of a crude mixture of, for example, fossil hydrocarbons or renewable bio-based natural substrates. The raw material is passed through a refining process where the crude mixture is generally separated, fractionated, reacted, and/or purified to produce finished products with specific qualities. Conventionally, a "refinery" utilizes fossil hydrocarbons (e.g., crude oil or coal) while a "biorefinery" utilizes biomass (e.g., lignocellulosic feedstocks).

Raw hydrocarbons are a mixture of larger and smaller molecules with differing molecular structures. There are aliphatic, olefinic, and aromatic sub-classifications of hydrocarbons as well as triglycerides and various other renewable feedstocks. Refining processes separate mixtures into subcomponents or break complex longer molecules into smaller molecules and/or reform them into larger molecules. The refining process may utilize a reaction vessel for performing a chemical change, resulting in a mixture of products, followed by a separation process to purify the reaction products. Some reaction vessels utilize reactions to remove trace amounts of unwanted molecules (e.g., hydrogen sulfide). Refinery processes invariably produce a mixture requiring purification through further processing and separation.

Industrial processing plants often require fractionation for recovery and refinement of finished products. The plant process energy consumed in fractionation often constitutes the largest energy requirement in the production life cycle of such products.

A common refining process separates mixtures through fractionation. Examples of refined products from fractionating include liquid fuels such as light-density gasoline, higher-density diesel fuel and jet fuel, specialized chemical feedstocks for plastics, and industrial solvents. Examples of gaseous fuels separated from petroleum range from methane to propane, leaving the highest-density solid hydrocarbons such as asphalt. An example of separating molecules with nearly identical properties is separation of aromatic chemicals including a toluene-xylene fraction where the boiling points of each component vary over a small range, with xylene comprising three isomers (meta-xylene, ortho-xylene, and para-xylene).

Standard practice in refining processes entails converting vapors into liquids using a condenser, an out-of-contact heat exchanger that reduces the temperature and pressure of a gas phase to the conditions required to achieve a phase change to liquid. Condensers typically transfer the heat of condensation of a vapor or gas to a liquid, such as cooling water provided by cooling towers, or to a gas, such as the atmosphere. Unlike regenerative heat exchangers that return energy for use in other processes, the vapors condensed are at a temperature and pressure that are too low for process re-use.

Fractionation system designs must meet a number of requirements appropriate to process design and investment goals. First-generation fractionation systems were implemented when simplicity was highly prized and environmental concerns related to energy usage were largely relegated to minimizing associated hazardous emissions. Today, policies and regulatory initiatives targeting the reduction of greenhouse-gas emissions are impacting consumers and producers of energy, creating incentives for improving energy efficiency and minimizing process environmental footprint.

Examples of regulations impacting energy consumers and producers include California's Low Carbon Fuel Standard (LCFS) and the U.S. EPA's Clean Power Plan. The LCFS models a fuel's lifecycle carbon dioxide ($CO_2$) emissions from production to consumption, thereby defining pathways for calculating each fuel's Carbon Intensity ("CI"). Each fuel's CI generates credits or requires the purchase of credits from other producers to meet California's CI targets. These credits are traded on an exchange that establishes their value and permits monetization by producers. Improvements in process energy efficiency are directly rewarded through the LCFS system, incentivizing energy-efficiency investments. This system, and similar systems under consideration by various governmental authorities globally, directly reward producers for reducing their energy requirements and associated CI score, even when low energy prices provide little or no economic incentive to make such investments. Additionally, such incentives promote the use of energy with low CI scores, such as wind and solar power generation, in process designs—rather than fossil fuel combustion.

The concept of mechanical vapor compression in fractionation has been disclosed in patents and deployed in reducing process energy requirements for many decades. Mechanical vapor compression has been widely deployed in water treatment, food processing, and brewing. The primary application has been in evaporation processes. When applied, mechanical vapor compression has typically been relegated to recovering energy within a single process.

Improved methods and systems are desired commercially for reducing energy demand and process carbon intensity in a wide range of industrial refineries and biorefineries.

SUMMARY OF THE INVENTION

Some variations of the invention provide a method for electrifying, decarbonizing, and reducing energy requirements in a refinery, wherein the method comprises integrating one or more vapor compression sub-systems within the refinery, and wherein the refinery comprises one or more vapor-processing units that are energy-integrated with multiple compressors contained collectively within the one or more vapor compression sub-systems.

In some embodiments, the one or more vapor compression sub-systems include at least two, or at least three, vapor compression sub-systems. One or more vapor compression sub-systems may include a mechanical vapor recompression unit. One or more vapor compression sub-systems may include a thermal vapor recompression unit.

The one or more vapor-processing units may include two or more vapor-processing units. At least one of the vapor-processing units may include a distillation unit, a stripping unit, an evaporator, a multiple-effect evaporator, a molecular-sieve unit, or a chemical reactor, for example. When a vapor-processing unit is a chemical reactor, the reactor may be configured for a chemical reaction selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclicization, coking, catalyst regeneration, and combinations thereof, for example.

In some embodiments, the vapor compression sub-system comprises multiple mechanical and/or thermal compressors or vapor jets, wherein cascaded heat to or from the multiple vapor-processing units is integrated with at least one distinct unit within the refinery, and wherein compressed process vapors and optionally generated steam are returned to the vapor-processing unit.

In some embodiments, the vapor compression sub-system comprises multiple mechanical and/or thermal compressors or vapor jets, wherein at least one of the multiple mechanical and/or thermal compressors or vapor jets is configured to cascade heat to or from a refinery unit that carries out a chemical reaction. The chemical reaction may be selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclicization, coking, catalyst regeneration, and combinations thereof.

In some embodiments, the vapor compression sub-system comprises multiple mechanical and/or thermal compressors or vapor jets, wherein at least one of the multiple mechanical and/or thermal compressors or vapor jets is configured to cascade heat to or from a refinery unit that carries out a thermal separation.

In some embodiments, the vapor compression sub-system comprises multiple mechanical and/or thermal compressors or vapor jets, wherein at least one of the multiple mechanical and/or thermal compressors or vapor jets is configured to cascade heat to or from a refinery unit that carries out a fuel or chemical storage operation.

In some embodiments, at least one of the vapor-processing units is configured to process a vapor comprising a refinery intermediate or product, wherein at least one of the vapor compression sub-systems is configured to compress a heat-exchange medium that is out-of-contact with the vapor.

The refinery may be selected from the group consisting of biorefineries, petroleum refineries, petrochemical plants, natural gas refineries, shale oil refineries, coal-derived product refineries, and syngas-derived product plants.

Other variations of the invention provide an energy-efficient system configured for a refinery, wherein the refinery is capable of converting a feedstock into a fuel or chemical, and wherein the refinery includes at least one vapor-processing unit that is configured to process a vapor comprising the fuel or chemical, the system comprising a vapor compression sub-system comprising a mechanical vapor recompression unit and/or a thermal vapor recompression unit, wherein the vapor compression sub-system is configured to recover heat from the vapor-processing unit and provide a reduction in process thermal energy usage in the refinery.

The system may comprise at least two vapor compression sub-systems or at least three vapor compression sub-systems, for example. The system may comprise at least two vapor-processing units.

A vapor-processing unit may be configured to purify the fuel or chemical. In certain embodiments, the vapor-processing unit is a distillation unit, a stripping unit, an evaporator, a multiple-effect evaporator, a molecular-sieve unit, or a chemical reactor, such as (but not limited to) a chemical is configured for a chemical reaction selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclicization, coking, catalyst regeneration, and combinations thereof. In common embodiments, the chemical reactor is a catalytic reactor.

The vapor compression sub-system may comprise multiple mechanical and/or thermal compressors or vapor jets, wherein cascaded heat to or from the vapor-processing unit is integrated with multiple units within the refinery, and wherein compressed fuel or chemical vapors and optionally generated steam are returned to the vapor-processing unit within the system.

The vapor compression sub-system may comprise multiple mechanical and/or thermal compressors or vapor jets, wherein at least one of the multiple mechanical and/or thermal compressors or vapor jets is configured to cascade heat to or from a refinery unit that carries out a chemical reaction, such as (but not limited to) oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclicization, coking, catalyst regeneration, and combinations thereof.

The vapor compression sub-system may comprise multiple mechanical and/or thermal compressors or vapor jets, wherein at least one of the multiple mechanical and/or thermal compressors or vapor jets is configured to cascade heat to or from a refinery unit that carries out a thermal separation.

The vapor compression sub-system may comprise multiple mechanical and/or thermal compressors or vapor jets, wherein at least one of the multiple mechanical and/or thermal compressors or vapor jets is configured to cascade heat to or from a refinery unit that carries out a fuel or chemical storage operation.

The energy-efficient system may be situated within a refinery selected from the group consisting of biorefineries, petroleum refineries, petrochemical plants, natural gas refineries, shale oil refineries, coal-derived product refineries, and syngas-derived product plants, for example.

Other variations of the invention provide an energy-efficient system configured for a refinery, wherein the refinery is capable of converting a feedstock into a fuel or chemical, wherein the system includes a vapor compression sub-system comprising a mechanical vapor recompression unit and/or a thermal vapor recompression unit, wherein the vapor compression sub-system is configured to compress a heat-exchange medium that is out-of-contact with the fuel or chemical, and wherein the vapor compression sub-system provides a reduction in process thermal energy usage in the refinery. This system may comprise at least two vapor compression sub-systems. In some embodiments, this system comprises at least two vapor-processing units.

The refinery typically includes at least one vapor-processing unit that is configured to process a vapor comprising the fuel or chemical. The vapor-processing unit may be configured to purify the fuel or chemical. In various embodiments, the vapor-processing unit is a distillation unit, a stripping unit, an evaporator, a multiple-effect evaporator, a molecular-sieve unit, or a chemical reactor. The chemical reactor may be configured for a chemical reaction selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclization, coking, catalyst regeneration, and combinations thereof, for example.

In some embodiments, the system comprises a first reboiler configured for out-of-contact heat exchange with the heat-exchange medium, wherein the system is configured to convey the heat-exchange medium, as compressed vapors, to a second reboiler configured to recycle heat to the vapor-processing unit. For example, the vapor-processing unit may be a distillation unit, wherein the heat-exchange medium recycles heat to a bottom product of the distillation unit.

In some embodiments in which the vapor compression sub-system is configured to compress a heat-exchange medium that is out-of-contact with the fuel or chemical, the vapor compression sub-system comprises multiple mechanical and/or thermal compressors or vapor jets, wherein cascaded heat to or from the vapor-processing unit is integrated with multiple units within the refinery, and wherein compressed fuel or chemical vapors and optionally generated steam are returned to the vapor-processing unit within the system.

In some embodiments in which the vapor compression sub-system is configured to compress a heat-exchange medium that is out-of-contact with the fuel or chemical, the vapor compression sub-system comprises multiple mechanical and/or thermal compressors or vapor jets, wherein at least one of the multiple mechanical and/or thermal compressors or vapor jets is configured to cascade heat to or from a refinery unit that carries out a chemical reaction (e.g., oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration for olefin formation, cyclization, coking, or catalyst regeneration).

In some embodiments in which the vapor compression sub-system is configured to compress a heat-exchange medium that is out-of-contact with the fuel or chemical, the vapor compression sub-system comprises multiple mechanical and/or thermal compressors or vapor jets, wherein at least one of the multiple mechanical and/or thermal compressors or vapor jets is configured to cascade heat to or from a refinery unit that carries out a thermal separation.

In some embodiments in which the vapor compression sub-system is configured to compress a heat-exchange medium that is out-of-contact with the fuel or chemical, the vapor compression sub-system comprises multiple mechanical and/or thermal compressors or vapor jets, wherein at least one of the multiple mechanical and/or thermal compressors or vapor jets is configured to cascade heat to or from a refinery unit that carries out a fuel or chemical storage operation.

In some embodiments in which the vapor compression sub-system is configured to compress a heat-exchange medium that is out-of-contact with the fuel or chemical, the refinery is selected from the group consisting of biorefineries, petroleum refineries, petrochemical plants, natural gas refineries, shale oil refineries, coal-derived product refineries, and syngas-derived product plants.

Figure 1:
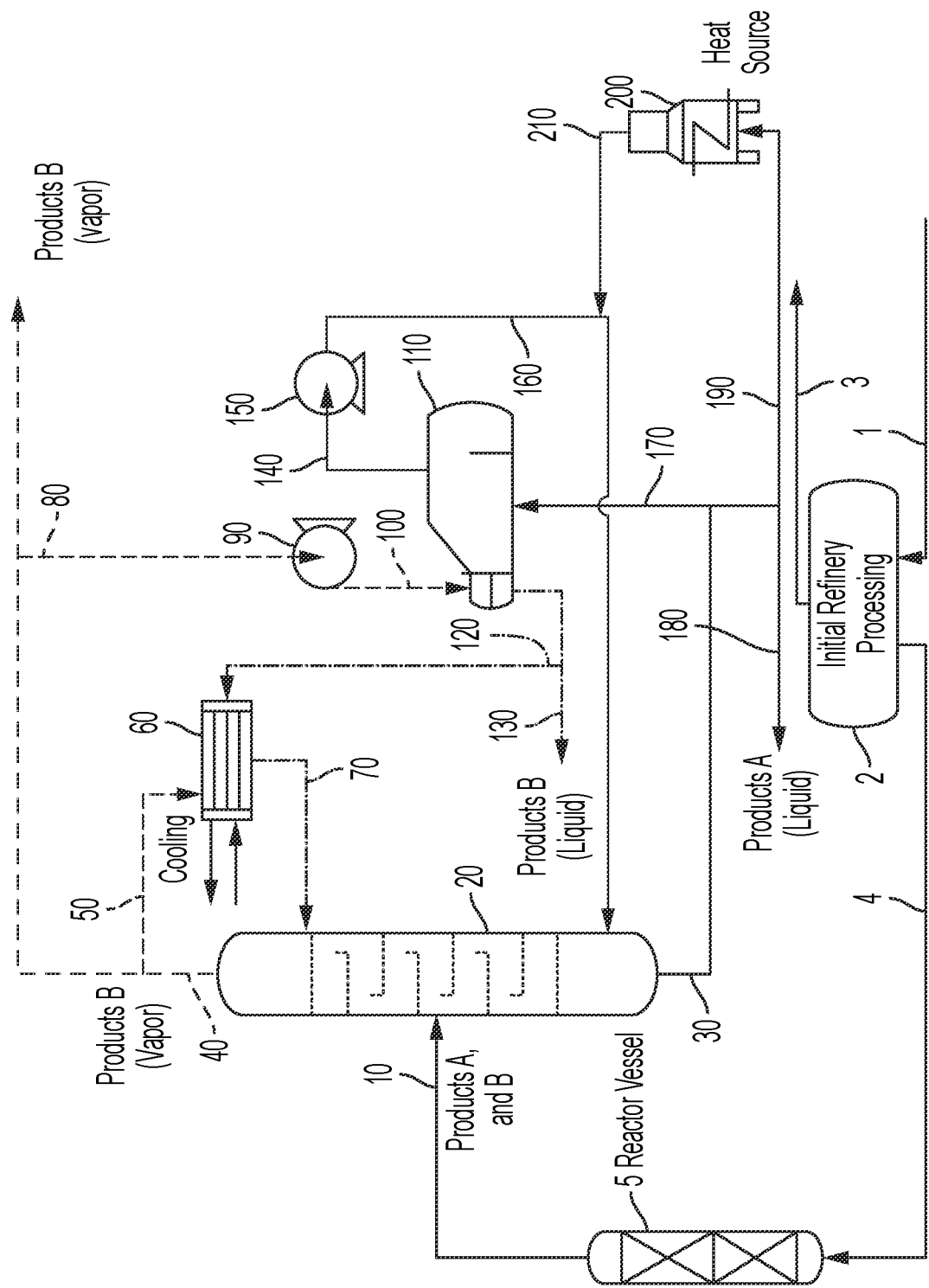
FIG. 1 is an exemplary block-flow diagram depicting a fractionation process for separation of a mixture into two components, in which two-component separation may be driven with mechanical vapor recompression, compressed vapors pass to a reboiler, fractionation process heat is recycled, and the fraction of the top product vapors that are condensed or compressed is adjusted.

These and other embodiments, features, and advantages of the present invention will become more apparent to those skilled in the art when taken with reference to the following detailed description.

DETAILED DESCRIPTION OF EMBODIMENTS OF THE INVENTION

Certain embodiments of the present invention will now be described in more detail, in a manner that will allow a person of ordinary skill in this art to make and use the present invention. All references herein to the "invention" shall be construed to refer to non-limiting embodiments disclosed in this patent application.

Unless otherwise indicated, all numbers expressing conditions, concentrations, yields, and so forth used in the specification and claims are to be understood as being modified in all instances by the term "about." Accordingly, unless indicated to the contrary, the numerical parameters set forth in the following specification and attached claims are approximations that may vary depending at least upon the specific analytical technique. Any numerical value inherently contains certain errors necessarily resulting from the standard deviation found in its respective testing measurements.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. If a definition set forth in this section is contrary to or otherwise inconsistent with a definition set forth in patents, published patent applications, and other publications that are incorporated by reference, the definition set forth in this specification prevails over the definition that is incorporated herein by reference.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

The invention is predicated on the use of multiple compressors to optimize process energy usage by increasing the pressure and/or temperature of vapors to levels that permit re-introduction of the heat of condensation into an integrated system with multiple processes.

Conventional plant designs typically cascade heat from processes operating at higher pressures and temperatures to processes operating at lower pressures and temperatures in order to maximize efficiency. This approach usually depends upon energy introduced at the higher state derived from the combustion of fuels. Cascading heat between processes increases the temperature range over which useful energy can be supplied to the processes, but ultimately results in the loss of the heat carrier's heat of condensation when vapors are cooled and returned to liquid form in conventional designs.

By contrast, the present inventors have realized that capturing the heat carrier in vapor form prior to condensation and increasing its pressure and temperature allows condensation to occur in a heat exchanger at a higher temperature. This principle allows the return of the heat of condensation for use in plant processes and reduces heat losses to cooling towers and the atmosphere. Integrating multiple processes and multiple compressors provides a means of greatly increasing process energy efficiency with existing distillation towers and reaction vessels, while meeting design system conditions.

Conventional applications for vapor compression avoid the more complex balancing and system design challenges of integrated systems by limiting themselves to single-process compression loops. This conventional approach facilitates high efficiencies in single processes, but at the cost of limiting the cumulative benefits of the "whole plant" approach of the present invention which leverages process synergies to expand available design options, thereby enabling process optimization to simultaneously meet environmental, economic, or efficiency targets, or a blend of such goals. Advanced control systems, including the use of machine learning and artificial intelligence, may support effective control of the invention's more complex, integrated system design.

The meaningful and sizable reduction in thermal energy usage of industrial processes according to embodiments of the invention will also substantially reduce the carbon intensity ascribed to the plant's process. The fractionation energy in a standard refinery or biorefinery without mechanical vapor compression represents a major portion of the total process energy. Mechanical vapor compression, when used in the fractionation separation stages, recycles the heat of fractionation by closed heat pump methods as described by U.S. Pat. No. 6,375,803 issued to Razzaghi et al. on Apr. 23, 2002, which is incorporated by reference herein. See also WO 2013/116789 A1 to Batty et al., published Aug. 8, 2012, which is incorporated by reference herein. In a system using best practices of mechanical vapor compression, the mechanical energy of the compression is equivalent to about 12% to 20% of the thermal energy required for the identical fractionation process without compression. The energy advantage in mechanical vapor compression will be about 5:1 or as high as 8:1. The market values of thermal energy and electricity vary by market, with electrical power costs and natural gas thermal energy costs showing a historic cost relationship per unit of energy of 2:1 to 20:1. The equipment investment costs of compression equipment are an additional determinant of the economic advantage of mechanical vapor compression in distillation. Electrical energy for driving the compression system brings the advantages of electrification including a reduction in carbon intensity, where the value generated through carbon credits may exceed that provided by the energy savings.

The invention provides the integration of mechanical vapor compression and/or thermal vapor compression in distillation, or other vapor-processing units, for a reduction in process energy in industrial refining or other industrial processes. Several examples are provided to demonstrate possible configurations of the use of mechanical or thermal vapor compression in liquid-vapor fractionation or other vapor processing for general refinery or biorefinery processing.

The term "refinery" herein refers to methods and systems in which raw materials are transformed into a mixture of components that require separation, purification, and/or refining to isolate finished products. Unless otherwise indicated, a refinery is a general term encompassing biorefineries as well. The finished products, with sufficient purification, have value as precursors to further reaction processes or commercial value in their natural state. Exemplary refinery methods and systems include, but are by no means limited to, biorefineries, petroleum refineries, petrochemical plants, natural gas refineries, shale oil refineries, coal-derived product refineries, and syngas-derived product plants.

The term "process energy" herein refers to the thermal energy required to raise process steam by burning fuels, the direct heating of processes by burning fuels, and the electrical energy required for mechanical power such as that used in pumping.

The use of vapor compression provides a means of increasing the temperature and pressure of vapors so that their heat of condensation is usable in upstream and downstream processing. Standard practice uses cooling water to condense vapors at low temperatures when forming final products or inter-process sub-products, losing the heat of condensation to cooling water, thereby preventing reintroduction and reuse of that heat. Vapor compression allows for the reuse of the heat of condensation when increased pressure raises the condensing temperature to a point above the temperature required for use in the process. Vapor compression is well-established in single-process applications such as water desalination and evaporation.

Integrating mechanical compression with multiple plant processes can minimize heat losses by providing advantages not available for typical cascaded heat integration. In cascaded heat integration, where energy can only be cascaded from higher to lower temperatures and pressures, the staged reduction in temperature and pressure eventually drops below the requirements for plant processes, at which point steam or process vapors are condensed, losing their latent heat. Vapor compression provides a means to raise these temperatures and pressures to a level that can be condensed and reintroduced, meeting process requirements, while minimizing energy lost to the environment. The complexity of balancing process energy needs across multiple processes has historically discouraged attempts at designing systems utilizing mechanical vapor compression in favor of simply cascading heat and discarding the heat of compression once vapors become "low-grade", i.e. too low for reuse. When vapor compression was used, process designers have historically applied vapor compression to single isolated processes with the advantage of lowering the energy to that isolated process, but not realizing the greater benefit available through the integration of multiple processes.

The concept of mechanical vapor compression in distillation has been deployed in reducing process requirements in refining for many decades. It has also been widely deployed in water desalination and process evaporation. Mechanical vapor compression, when used in distillation, recycles the heat of distillation by a closed heat pump, as disclosed, for example, in U.S. Pat. Nos. 4,340,446, 4,422,903, 4,539,076, 4,645,569, 4,692,218, 4,746,610, 5,294,304, 7,257,945, 8,101,217, 8,101,808, 8,114,255, 8,128,787, 8,283,505, 8,304,588, 8,535,413, and 8,614,077, which are hereby incorporated by reference herein. Thermal vapor compression, when used in distillation, evaporation, dehydration, and drying, recycles latent heat by a closed heat pump, as disclosed for example in U.S. Pat. Nos. 5,772,850, 4,536,258, and 4,585,523, which are hereby incorporated by reference herein.

In this disclosure, mechanical vapor recompression (MVR) and/or thermal vapor recompression (TVR) are preferably used to produce vapor that meets conditions to best integrate and optimize energy recovery between processes, and to reduce overall process thermal energy usage in the refinery. The heat of condensation of the compressed vapors provides energy that may be used elsewhere within an integrated refinery. Heat exchangers utilizing multiple effects, thermal vapor recompression, and/or mechanical vapor recompression are used to balance process conditions by increasing or decreasing vapor energy to serve process design requirements.

All instances of "vapor compression," "vapor recompression," MVR, TVR, and the like mean mechanical vapor recompression, thermal vapor recompression, or a combination thereof. Thermal vapor recompression may also be referred to as thermocompression or steam compression.

Some variations of the invention provide a method for electrifying, decarbonizing, and reducing energy requirements in a refinery, wherein the method comprises integrating one or more vapor compression sub-systems within the refinery, and wherein the refinery comprises one or more vapor-processing units that are energy-integrated with multiple compressors contained collectively within the one or more vapor compression sub-systems.

In some embodiments, the one or more vapor compression sub-systems include at least two, or at least three, vapor compression sub-systems. One or more vapor compression sub-systems may include a mechanical vapor recompression unit. One or more vapor compression sub-systems may include a thermal vapor recompression unit.

The one or more vapor-processing units may include two or more vapor-processing units. At least one of the vapor-processing units may include a distillation unit, a stripping unit, an evaporator, a multiple-effect evaporator, a molecular-sieve unit, or a chemical reactor, for example. When a vapor-processing unit is a chemical reactor, the reactor may be configured for a chemical reaction selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclization, coking, catalyst regeneration, and combinations thereof, for example.

In some embodiments, the vapor compression sub-system comprises multiple mechanical and/or thermal compressors or vapor jets, wherein cascaded heat to or from the multiple vapor-processing units is integrated with at least one distinct unit within the refinery, and wherein compressed process vapors and optionally generated steam are returned to the vapor-processing unit.

In some embodiments, the vapor compression sub-system comprises multiple mechanical and/or thermal compressors or vapor jets, wherein at least one of the multiple mechanical and/or thermal compressors or vapor jets is configured to cascade heat to or from a refinery unit that carries out a chemical reaction. The chemical reaction may be selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclization, coking, catalyst regeneration, and combinations thereof.

In some embodiments, the vapor compression sub-system comprises multiple mechanical and/or thermal compressors or vapor jets, wherein at least one of the multiple mechanical and/or thermal compressors or vapor jets is configured to cascade heat to or from a refinery unit that carries out a thermal separation.

In some embodiments, the vapor compression sub-system comprises multiple mechanical and/or thermal compressors or vapor jets, wherein at least one of the multiple mechanical and/or thermal compressors or vapor jets is configured to cascade heat to or from a refinery unit that carries out a fuel or chemical storage operation.

In some embodiments, at least one of the vapor-processing units is configured to process a vapor comprising a refinery intermediate or product, wherein at least one of the vapor compression sub-systems is configured to compress a heat-exchange medium that is out-of-contact with the vapor.

The refinery may be selected from the group consisting of biorefineries, petroleum refineries, petrochemical plants, natural gas refineries, shale oil refineries, coal-derived product refineries, and syngas-derived product plants.

Other variations of the invention provide an energy-efficient system configured for a refinery, wherein the refinery is capable of converting a feedstock into a fuel or chemical, and wherein the refinery includes at least one vapor-processing unit that is configured to process a vapor comprising the fuel or chemical, the system comprising a vapor compression sub-system comprising a mechanical vapor recompression unit and/or a thermal vapor recompression unit, wherein the vapor compression sub-system is configured to recover heat from the vapor-processing unit and provide a reduction in process thermal energy usage in the refinery.

The system may comprise at least two vapor compression sub-systems or at least three vapor compression sub-systems, for example. The system may comprise at least two vapor-processing units.

A vapor-processing unit may be configured to purify the fuel or chemical. In certain embodiments, the vapor-processing unit is a distillation unit, a stripping unit, an evaporator, a multiple-effect evaporator, a molecular-sieve unit, or a chemical reactor, such as (but not limited to) a chemical is configured for a chemical reaction selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclicization, coking, catalyst regeneration, and combinations thereof. In common embodiments, the chemical reactor is a catalytic reactor.

The vapor compression sub-system may comprise multiple mechanical and/or thermal compressors or vapor jets, wherein cascaded heat to or from the vapor-processing unit is integrated with multiple units within the refinery, and wherein compressed fuel or chemical vapors and optionally generated steam are returned to the vapor-processing unit within the system.

The vapor compression sub-system may comprise multiple mechanical and/or thermal compressors or vapor jets, wherein at least one of the multiple mechanical and/or thermal compressors or vapor jets is configured to cascade heat to or from a refinery unit that carries out a chemical reaction, such as (but not limited to) oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclicization, coking, catalyst regeneration, and combinations thereof.

The vapor compression sub-system may comprise multiple mechanical and/or thermal compressors or vapor jets, wherein at least one of the multiple mechanical and/or thermal compressors or vapor jets is configured to cascade heat to or from a refinery unit that carries out a thermal separation.

The vapor compression sub-system may comprise multiple mechanical and/or thermal compressors or vapor jets, wherein at least one of the multiple mechanical and/or thermal compressors or vapor jets is configured to cascade heat to or from a refinery unit that carries out a fuel or chemical storage operation.

The energy-efficient system may be situated within a refinery selected from the group consisting of biorefineries, petroleum refineries, petrochemical plants, natural gas refineries, shale oil refineries, coal-derived product refineries, and syngas-derived product plants, for example.

Other variations of the invention provide an energy-efficient system configured for a refinery, wherein the refinery is capable of converting a feedstock into a fuel or chemical, wherein the system includes a vapor compression sub-system comprising a mechanical vapor recompression unit and/or a thermal vapor recompression unit, wherein the vapor compression sub-system is configured to compress a heat-exchange medium that is out-of-contact with the fuel or chemical, and wherein the vapor compression sub-system provides a reduction in process thermal energy usage in the refinery. This system may comprise at least two vapor compression sub-systems. In some embodiments, this system comprises at least two vapor-processing units.

The refinery typically includes at least one vapor-processing unit that is configured to process a vapor comprising the fuel or chemical. The vapor-processing unit may be configured to purify the fuel or chemical. In various embodiments, the vapor-processing unit is a distillation unit, a stripping unit, an evaporator, a multiple-effect evaporator, a molecular-sieve unit, or a chemical reactor. The chemical reactor may be configured for a chemical reaction selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclicization, coking, catalyst regeneration, and combinations thereof, for example.

In some embodiments, the system comprises a first reboiler configured for out-of-contact heat exchange with the heat-exchange medium, wherein the system is configured to convey the heat-exchange medium, as compressed vapors, to a second reboiler configured to recycle heat to the vapor-processing unit. For example, the vapor-processing unit may be a distillation unit, wherein the heat-exchange medium recycles heat to a bottom product of the distillation unit.

In some embodiments in which the vapor compression sub-system is configured to compress a heat-exchange medium that is out-of-contact with the fuel or chemical, the vapor compression sub-system comprises multiple mechanical and/or thermal compressors or vapor jets, wherein cascaded heat to or from the vapor-processing unit is integrated with multiple units within the refinery, and wherein compressed fuel or chemical vapors and optionally generated steam are returned to the vapor-processing unit within the system.

In some embodiments in which the vapor compression sub-system is configured to compress a heat-exchange medium that is out-of-contact with the fuel or chemical, the vapor compression sub-system comprises multiple mechanical and/or thermal compressors or vapor jets, wherein at least one of the multiple mechanical and/or thermal compressors or vapor jets is configured to cascade heat to or from a refinery unit that carries out a chemical reaction (e.g., oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration for olefin formation, cyclicization, coking, or catalyst regeneration).

In some embodiments in which the vapor compression sub-system is configured to compress a heat-exchange medium that is out-of-contact with the fuel or chemical, the vapor compression sub-system comprises multiple mechanical and/or thermal compressors or vapor jets, wherein at least one of the multiple mechanical and/or thermal compressors or vapor jets is configured to cascade heat to or from a refinery unit that carries out a thermal separation.

In some embodiments in which the vapor compression sub-system is configured to compress a heat-exchange medium that is out-of-contact with the fuel or chemical, the vapor compression sub-system comprises multiple mechanical and/or thermal compressors or vapor jets, and wherein at least one of the multiple mechanical and/or thermal compressors or vapor jets is configured to cascade heat to or from a refinery unit that carries out a fuel or chemical storage operation.

In some embodiments in which the vapor compression sub-system is configured to compress a heat-exchange medium that is out-of-contact with the fuel or chemical, the refinery is selected from the group consisting of biorefineries, petroleum refineries, petrochemical plants, natural gas refineries, shale oil refineries, coal-derived product refineries, and syngas-derived product plants.

A more detailed description of certain embodiments of the present invention such that a person of ordinary skill in this art can make and use the present invention follows. Note that all references herein to the "invention" shall be construed as references to embodiments of the invention.

It will be understood that while FIG. 1, FIG. 2, FIG. 3 and FIG. 4, and much of the present description, refer to mechanical vapor compression, the principles of the invention may alternatively, or additionally, be applied to thermal vapor compression. See commonly owned U.S. patent application Ser. No. 15/711,699, filed on Sep. 21, 2017 (and published as US 2018/0028934 A1 on Feb. 1, 2018), which is hereby incorporated by reference herein for its descriptions of mechanical vapor compression, thermal vapor compression, and other features that may be applied to some embodiments of the present invention.

It will also be understood that while much of the present description refers to distillation units, the principles herein may alternatively, or additionally, be applied to other vapor-processing units, including (but not limited to) stripping units, evaporators (e.g., multiple-effect evaporators), molecular-sieve units, and chemical reactors.

Each schematic drawing, FIGS. 1, 2, 3, and 4, shows a generalized process flow for a refinery. The drawings each have a feedstock described as a Raw Material Petroleum/Petrochemical, as an example, passing to a generalized refinery process where a mixture of subclass compounds is extracted by ordinary refining methods, and where these subclasses of compounds pass to a reactor vessel where ordinary refinery chemical reactions or processing lead to a fraction of products which are separated through distillation.

The biorefinery, petroleum and/or petrochemical refinery process stages, as found in each schematic flow diagram (FIG. 1, FIG. 2, FIG. 3, and FIG. 4) herein and such stages refer generally to a refining process resulting in a mixture of products that is purified by a fractionation process. The invention is not limited in the number of processes with fractionation that can be included.

In some embodiments, the refinery process steps or stages or system units are described as follows:

1) A raw material, such as petroleum, natural agricultural products, or a petrochemical precursor, is fed to a refining process where an initial refining process stage passes a subclass of chemicals to a reaction vessel where downstream components are fractionated;

2) a counterflow fractionation separation of a mixture process by physically dividing the feedstock materials into two product streams with each stream richer in one of the components;

3) a separation made by vaporizing the components with lower boiling temperatures in a counterflow fractionation system;

4) a separation made by condensing the components with higher boiling temperatures as liquid components moving down the fractionation system;

5) a fractionation separation driven by boiling the higher-temperature boiling component at the bottom of the fractionation system as the higher temperature boiling component moves up as vapor while the counterflowing liquid moves down the fractionation system;

6) the counterflow fractionation system dynamically forms a temperature gradient over the vertical length of the fractionation with the highest temperature at the bottom and lowest at the top;

7) the heat driving the fractionation system enters at the bottom and passes out the top;

8) the bottom component of the fractionation system may be boiled by burning fuel to drive the fractionation with the top product being condensed and/or the top vapors compressed to higher pressure, raising the condensing temperature to a higher temperature than the bottom boiling temperature for recycling the fractionation system heat or the top product condensation heat may be transferred by an out-of-contact reboiler to a separate medium (e.g., water vapor or ammonia vapor) where that medium is compressed to a temperature that permits recycling of the fractionation system heat to the bottom product of the fractionation;

9) multiple fractionations for separation are used in complex refinery processes where many components are purified to finished products; and/or 10) multiple fractionations may be employed in which the product mixtures are refined in multiple stages driven by burning fuel and/or may be driven by compressing the top product vapors from the fractionation system.

The general refinery process refers to one or more fractionation stages in which each fractionation requires energy in the form of thermal/fuel or mechanical/electrical, where the thermal and mechanical energy supply the heat to drive the separation of a mixture into a refined product. The portion of the energy that is provided from the burning of fuel versus the portion of the heat supplied by mechanical vapor compression provided by electrically powered compressors may be adjusted to meet the energy management requirements of each fractionation stage.

The mechanical energy required in the closed compression loop may be less than the thermal energy recycled in the process energy distribution for the refinery's fractionation system as described above. Fractionation is typically the largest energy consuming stage in a refinery and therefore provides the largest potential opportunity for reducing the total energy of the process. Examples of the different options available to use mechanical vapor compression in the refinery are shown in the four schematic drawings in FIG. 1, FIG. 2, FIG. 3, and FIG. 4, where the thermal and mechanical-electrical distribution of energy in this part of the refinery is described.

FIG. 1 encompasses a downstream fractionation process for separation of a mixture into two components. FIG. 1 shows one fractionation where the two-component separation may be driven with thermal energy and/or mechanical vapor recompression with the lighter finished product passed to later processing in liquid form or vapor form. FIG. 1 shows a process in which a two-component mixture passes to a fractionation process, wherein the lighter component vapors are condensed or compressed and the compressed vapors pass to a reboiler, wherein the fractionation process heat is recycled to the fractionation process, and wherein the fraction of the top product vapors that are condensed or compressed is set to accommodate a selected balance for the management of the process. The thermal heat and condensation cooling can be adjusted together with the compression cycle to manage the optimal production, with the possibility of removing all the combustion-supplied thermal energy by compressing all the vapors to recycle the heat required for the operation of the fractionation process.

Figure 2:
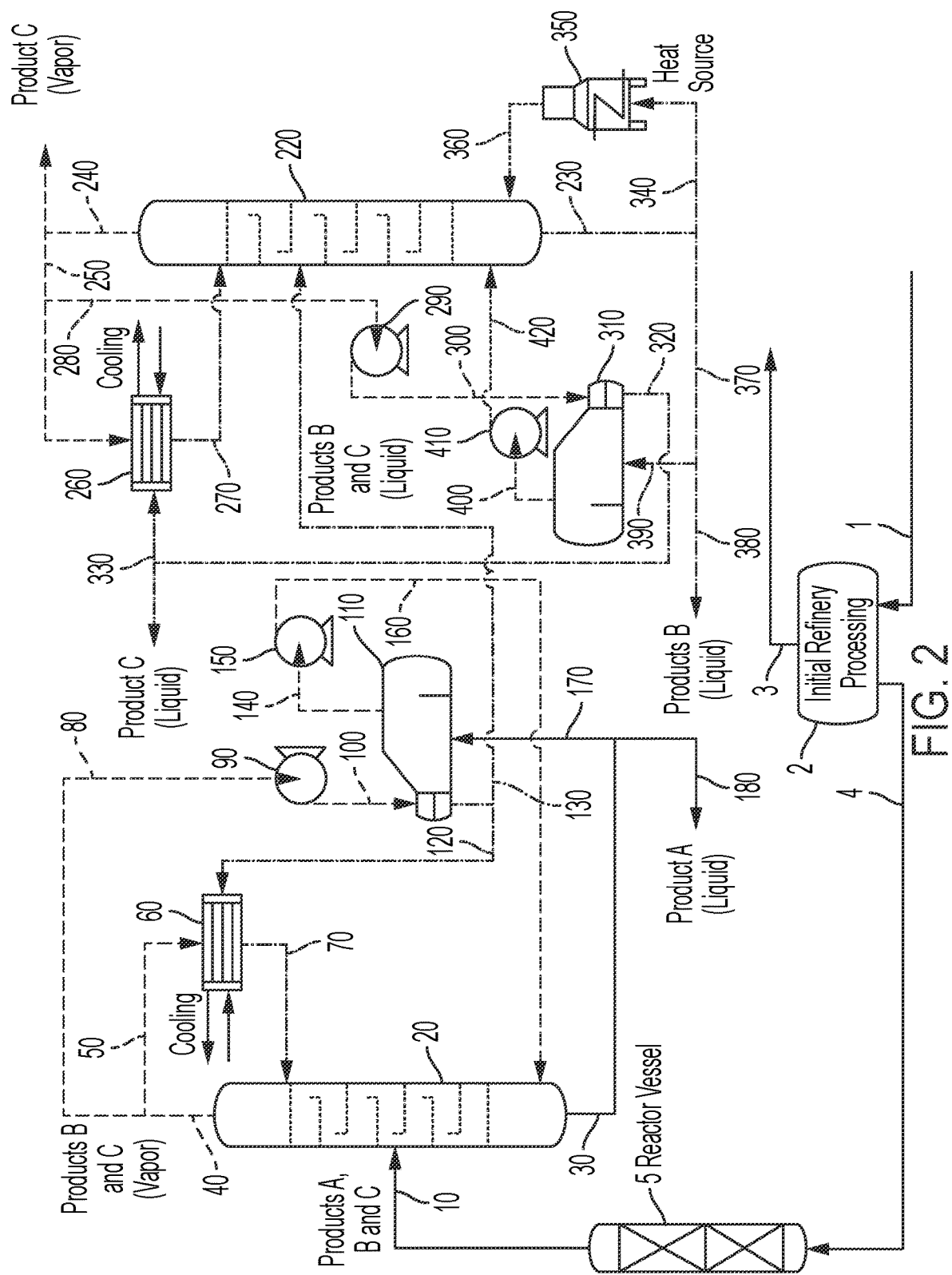
FIG. 2 is an exemplary block-flow diagram depicting multiple fractionations for the separation of a mixture into three components, in mechanical vapor recompression is used to produce finished products.

FIG. 2 demonstrates multiple fractionations for the separation of a mixture into three components. FIG. 2 has more than one fractionation, for the separation of more than two components, where thermal energy and/or mechanical vapor recompression are used to produce finished products. The lighter finished products pass to later processing in liquid form or vapor form. FIG. 2 is a schematic drawing showing a multicomponent mixture passing to multiple fractionations where the light component vapors from each fractionation process are compressed with each of the compressed vapors passing to a reboiler where the fractionation heat is recycled to the fractionation process. The fraction of the top vapors that are condensed or compressed may be set to accommodate a selected balance for the management of the process. The thermal heat and condensation cooling can be adjusted together with the compression cycle in each fractionation process to manage the optimal production, including the possibility of removing all the combustion-supplied thermal energy by compressing all the vapors to the level needed to provide the heat required for the operation of the fractionation process.

Figure 3:
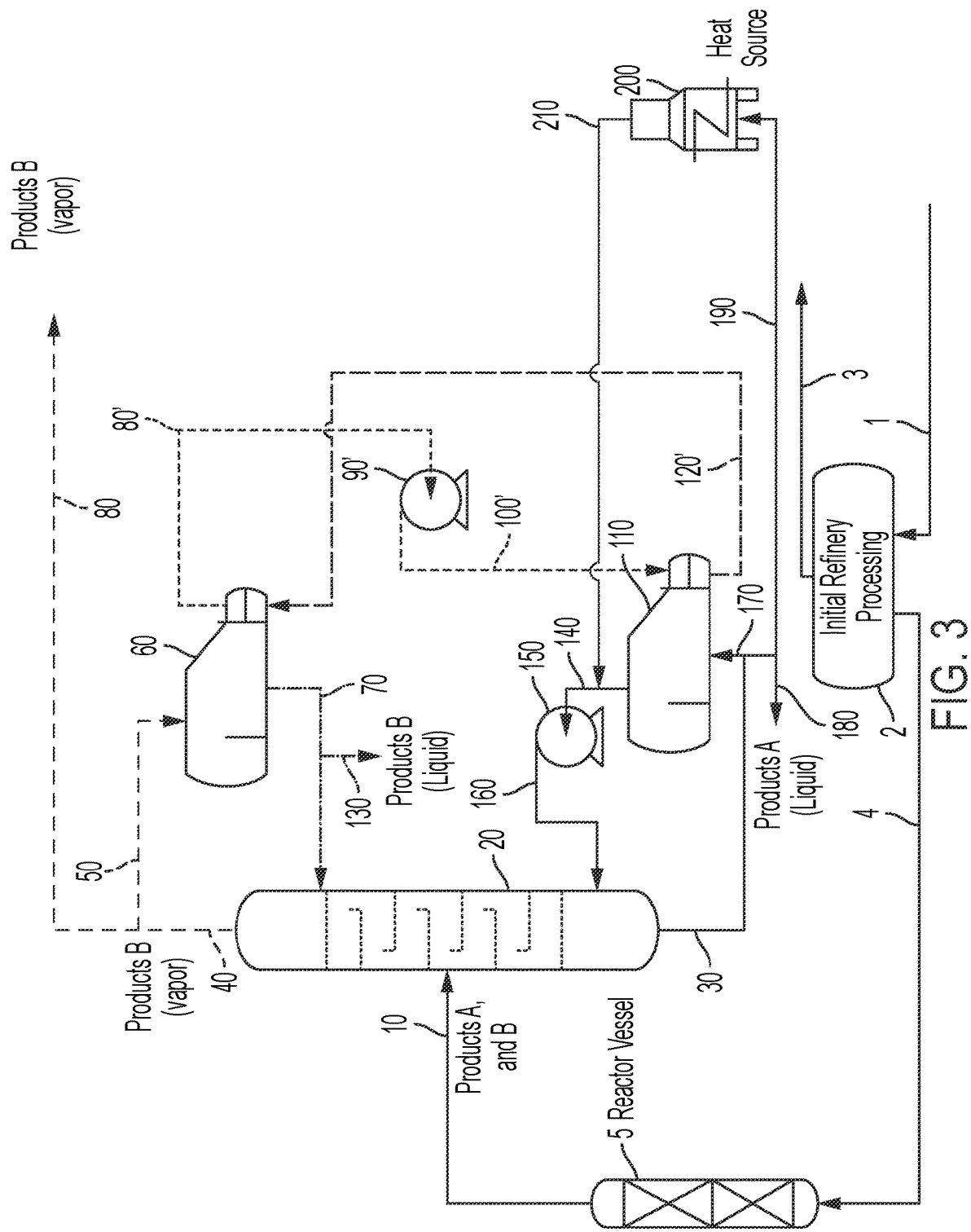
FIG. 3 is an exemplary block-flow diagram depicting a process in which a two-component mixture passes to a fractionation process wherein the lighter component vapors are condensed in a reboiler and an out-of-contact separate medium evaporates forming vapors that are compressed.

FIG. 3 shows a process in which a two-component mixture passes to a fractionation process wherein the lighter component vapors are condensed in a reboiler and an out-of-contact separate medium evaporates forming vapors that are compressed. These compressed vapors pass to a second reboiler where the fractionation heat is recycled to the fractionation process, and the fraction of the top product vapors that are condensed may be set to accommodate a selected balance for the management of the process. The thermal heat and condensation cooling can be adjusted by controlling the separate medium with the compression cycle to achieve a targeted production rate or set of process conditions including the option of removing all the combustion-supplied thermal energy by compressing all the vapors to the required state that allows upgrading and recycling to provide all of the heat required for the operation of the fractionation process.

Figure 4:
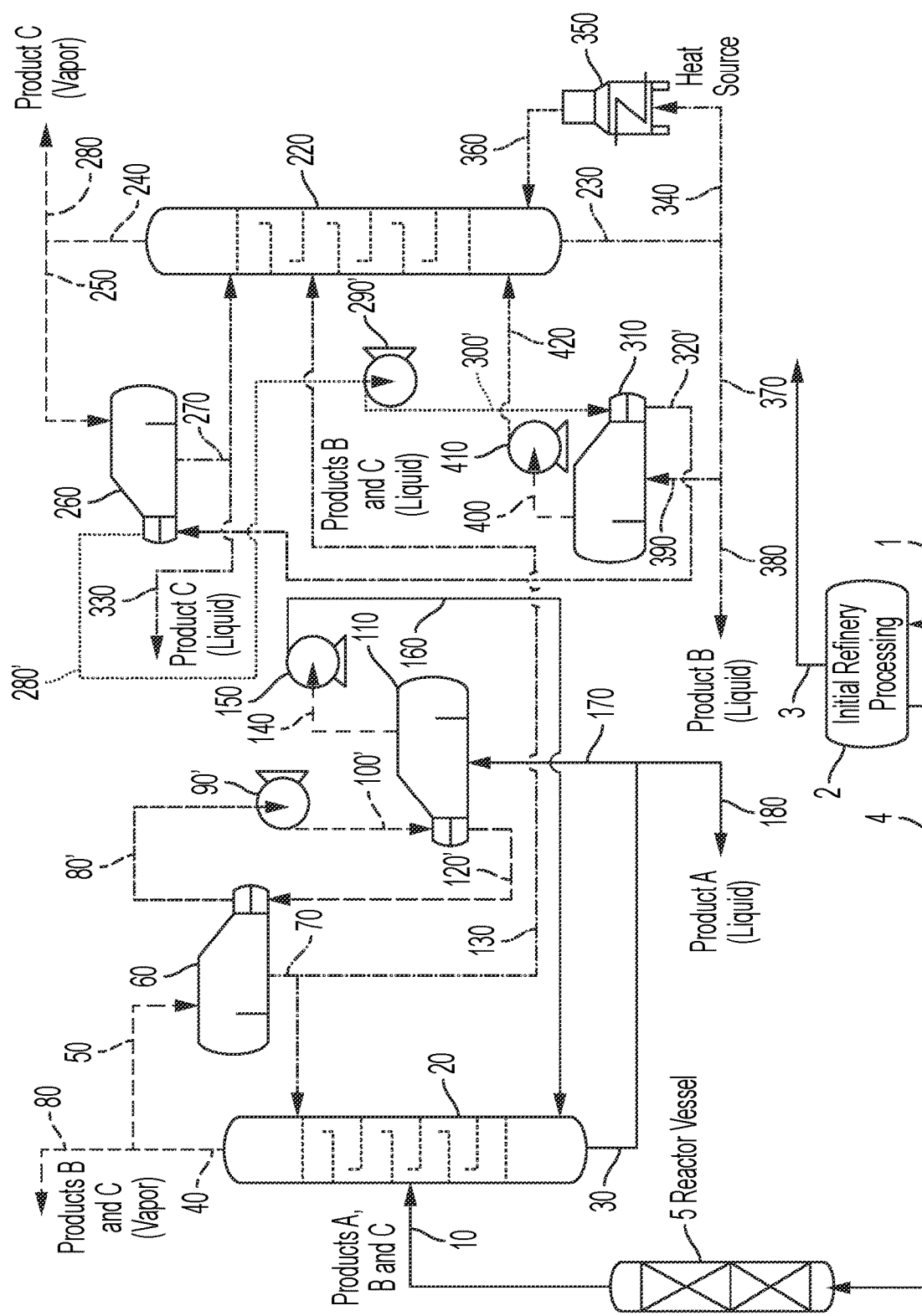
FIG. 4 is an exemplary block-flow diagram depicting a multicomponent mixture passing to multiple fractionations where the light component vapors from each fractionation are condensed in a reboiler and an out-of-contact separate medium evaporates forming vapors that are compressed.

FIG. 4 is a schematic drawing showing a multicomponent mixture passing to multiple fractionations where the light component vapors from each fractionation are condensed in a reboiler and an out-of-contact separate medium evaporates forming vapors that are compressed. Each of the separated medium compressed vapors pass to a second reboiler where the fractionation heat is recycled to the fractionation process. The fraction of the top vapors that are condensed may be set to accommodate a selected balance for the management of the process. The thermal heat and condensation cooling can be adjusted together with the compression cycle in each fractionation to achieve a targeted production rate or set of process conditions including the option of removing all the combustion-supplied thermal energy by compressing all the vapors to the state required to allow upgrading and recycling to provide all of the heat required for the operation of the fractionation process.

The embodiments shown in FIG. 1, FIG. 2, FIG. 3, and FIG. 4 all depict a process path starting with a feedstock as a raw material comprised of a biomass-based precursor, a petroleum-based precursor, or a chemical fraction where the effluent flows via pipe 1 with the mixture of components passing to the initial refining process 2. Fractions separated from the raw material pass via pipe 3 for further refining and the selected fraction passes via line 4 to reaction vessel 5. The fraction in line 4 may be sub-classified as aliphatic, olefinic, aromatic, oxygenate, cellulosic, hemicellulosic, lignin, or another sub-classification, for example. Reaction vessel 5 may be configured to carry out an oxidation, reduction, hydrocracking, molecular fractionation, reformation, transesterification, isomerization, or hydrolysis process, or a combination thereof, for example. The resulting product mixture of the reaction process passes to a fractionation process via pipe 10, which delivers the mixture to a fractionation system 20, where the component mixture is separated into a higher temperature boiling liquid bottom component passing via pipe 30, and a lower temperature boiling vapor top component passing by pipe 40.

The fractionation system's top vapors flowing via pipe 40, may be passed by pipe 50 to condenser 60 in FIG. 1 and FIG. 2, or to reboiler 60 in FIG. 3 and FIG. 4, or by pipe 80 in vapor form to another process (not described here). In FIG. 3 and FIG. 4, the heat of condensation via reboiler 60 generates vapor in a separate medium that passes to pipe 80'. The balance of the vapors for FIG. 1 and FIG. 2 pass to compressor 90, or the generated vapors for FIG. 3 and FIG. 4 pass to compressor 90'. Compressor 90 or compressor 90' raises the vapors to a higher pressure increasing the condensing temperature, passing by line 100 for FIG. 1 and FIG. 2 or 100' for FIG. 3 and FIG. 4 to reboiler 110. In reboiler 110, the vapors condense and pass their latent heat back to the bottom product of fractionation column 20. In FIG. 1, the condensed top product vapors liquefy passing through pipe 120 to return to condenser 60 with the potential for a portion of the condensate to pass via pipe 130 for capture in liquid phase as a finished product or passing for later processing as seen in FIG. 2. In FIG. 3 and FIG. 4, the vapors compressed by compressor 90' pass via line 100' and are liquefied in reboiler 110 passing the latent heat to the bottom liquid fraction of the fractionation column. In FIG. 3 and FIG. 4, the condensed separate medium liquid passes by pipe 120' back to reboiler 60' at a reduced pressure to condense the top product of column 20. In FIG. 1 and FIG. 2, the liquid condensed in condenser 60, being from the reboiler pipe 120 or vapor pipe 50, combines to form reflux used in fractionation passing via pipe 70. In FIG. 3 and FIG. 4, the liquid condensed in reboiler 60, passes back to the fractionation column 20 via pipe 70. The top product of the fractionation column 20 is condensed in condenser 60 for FIG. 1 or the reboiler 60 for FIG. 3 passing via 130 to form a refined product. In FIG. 2 and FIG. 4, the condensed top product passes via 130 for further fractionation. In FIG. 1, FIG. 2, FIG. 3, and FIG. 4, the fractionation bottom product from fractionation 20 passes via pipe 30 to pipe 170 to reboiler 110 where the bottom product liquid is boiled by heat from the condensation of the top product in FIG. 1 and FIG. 2 or the condensation of the separate medium generated by the fractionation top product condensed in reboiler 60 in FIG. 3 and FIG. 4, with the finished bottom product in all figures passing via pipe 180. In all figures, the generated vapors from reboiler 110 pass via pipe 140 to compressor 150 where the pressure of the vapor is increased in pipe 160 that passes the vapor and the heat of condensation back to fractionation 20. The fractionation bottom product may pass to a thermal heater 200 that burns fuel, heating the bottom product passing via pipe 190. The vaporized bottom product is passed back to fractionation via pipe 210.

FIG. 1 and FIG. 3 show the fractionation column 20 with the option of being fully or partially driven by the fuel burning in heater 200 or driven by other refinery processes as an optional heat source in conjunction with the closed loop compression cycle by compressor 90 and compressor 150 in FIG. 1 and compressor 90' and compressor 150 in FIG. 3. The fractionation may be balanced between thermal and mechanical vapor compression to achieve the desired product separation.

FIG. 2 and FIG. 4 show multiple fractionations for a feed source mixture providing more finished products. FIG. 2 and FIG. 4 follow the same general product flows as the first fractionation column 20 shown in FIG. 1 and FIG. 3. Continuing within FIG. 2 and FIG. 4, the top product from the first fractionation is further separated by down flow fractionation 220 via pipe 130. Fractionation 220 passes the bottom product by pipe 230 and top product by pipe 240. The top product passing via pipe 240 may have a portion passed to finished product in vapor phase and/or a top product passing via pipe 250 to condenser 260 in FIG. 2 or reboiler 260 in FIG. 4. The vapors passing via pipe 250 from fractionator 220 may pass part or all of the vapors via line 280 to compressor 290 in FIG. 2 that compresses vapors to a higher pressure and passes them by pipe 300 for condensing in reboiler 310 or, in FIG. 4, to condense in reboiler 260. In FIG. 4 the reboiler 260 condenses top product from fractionation column 220, vaporizing a separate medium passing via pipe 280' to compressor 290', then to pipe 300'. In FIG. 2 and FIG. 4, the compressed vapors—top product in FIG. 2 or separate medium in FIG. 4—condense and generate vapors in reboiler 310. The fractionation column 220 top product condenses in reboiler 310 in FIG. 2 or reboiler 260 in FIG. 4 passing via pipe 270 as reflux to fractionation column 220. In FIG. 4, the portion of top product from fractionation 220 not refluxed passes to finished product via pipe 330 whereas in FIG. 2 the condensate from reboiler 310 is returned to condenser 260 as reflux with the excess being finished top product from fractionator 220 passing via pipe 330.

In FIG. 2 and FIG. 4, the bottom product from fractionation 220 passes by pipe 230 via pipe 340 passing to the fuel burning heater 350 with vapors produced returning via pipe 360 to drive fractionation 220. The bottom product from fractionation 220 may pass in portion or in total via pipe 370 to form the finished bottom product by pipe 380 or pass by pipe 390 to reboiler 310 where the liquid vaporizes with the vapors passing via line 400 to compressor 410 whence higher pressure vapors pass by pipe 420 to fractionation 220.

FIG. 2 and FIG. 4 shows fractionation 220 with the option of being fully or partially driven by the fuel burning or driven by other refinery processes in heater 410 as an optional heat source in conjunction with the closed loop compression cycle by compressor 290 and compressor 350 in FIG. 2 and compressor 290' and compressor 410 in FIG. 4. The fractionation may be balanced between thermal and mechanical vapor compression to achieve the desired product separation.

In FIG. 3 and FIG. 4, a separate out-of-contact heat-transfer medium (e.g., steam/water or ammonia vapor/liquid) moves heat between two reboilers—one condensing and the other evaporating. The configurations of FIG. 3 and FIG. 4, just like those for FIG. 1 and FIG. 2, utilize the principle of heat pumps for process heat management.

It should be noted that regarding FIGS. 1, 2, 3, and 4, specific unit operations may be omitted in some embodiments and in these or other embodiments, other unit operations not explicitly shown may be included. Various valves, pumps, meters, sensors, sample ports, etc. are not shown in these block-flow diagrams. Additionally, multiple pieces of equipment, either in series or in parallel, may be utilized for any unit operations. Also, solid, liquid, and gas streams produced or existing within the process may be independently recycled, passed to subsequent steps, or removed/purged from the process at any point.

FIG. 1, FIG. 2, FIG. 3, and FIG. 4 describe fractionation systems that may be balanced between thermally heated processes and mechanical vapor compression. Since refineries may have multiple fractionations for the refinement of multiple product streams, in some embodiments, there is continued addition of fractionation separations by repetition of the schematic design with further fractionation separations added.

When the vapor-processing unit is a chemical reactor (e.g., a catalytic reactor), such reactor may be for a chemical reaction selected from the group consisting of, for example, oxidation, reduction, hydrolysis, transesterification, condensation, oligomerization, polymerization, crystallization, isomerization, reforming, cracking, dehydrosulfurization, hydrotreating, alkylation, hydrogenation, dehydrogenation, dehydration (olefin formation), cyclicization, coking, catalyst regeneration, and combinations thereof.

In various embodiments relating specifically to biorefineries, a starting biomass feedstock may be selected from agricultural crops and/or agricultural residues. In some embodiments, agricultural crops are selected from starch-containing feedstocks, such as corn, wheat, cassava, rice, potato, millet, sorghum, or combinations thereof. In some embodiments, agricultural crops are selected from sucrose-containing feedstocks, such as sugarcane, sugar beets, or combinations thereof. Lignocellulosic biomass may also be used as the biomass feedstock. Lignocellulosic biomass includes, for example, plant and plant-derived material, vegetation, agricultural waste, forestry waste, wood waste, paper waste, animal-derived waste, poultry-derived waste, and municipal solid waste.

Some embodiments incorporate a process-control sub-system configured for automatically controlling a vapor-processing unit and a vapor compression sub-system. The process-control sub-system may utilize artificial intelligence, such as one or more machine-learning algorithms, one or more deep-learning algorithms, one or more neural networks, or a combination thereof.

The throughput, or process capacity, may vary widely from small laboratory-scale units to full commercial-scale refineries, including any pilot, demonstration, or semi-commercial scale systems. In various embodiments, the process capacity is at least about 1 kg/day, 10 kg/day, 100 kg/day, 1 ton/day (all tons are metric tons), 10 tons/day, 100 tons/day, 1000 tons/day, 10000 tons/day, or higher.

The refinery may be a retrofit to an existing plant. In other embodiments, the refinery is a greenfield plant. Some embodiments employ a mechanical vapor compression system along with a standard thermally driven process in the original system to capture the synergies available from the two combined processes. Some embodiments provide a retrofit or augmentation of a standard refinery (which may be a greenfield refinery or an existing refinery) with an integrated mechanical vapor compression system. The retrofit may provide the option of diverting vapors (of a standard thermally driven process) into a mechanical vapor compression system integrated into the refinery.

As will be appreciated by a person of ordinary skill in the art, the principles of this disclosure may be applied to many refinery or industrial-plant configurations beyond those explicitly disclosed or described in the drawings hereto. Various combinations are possible and selected embodiments from some variations may be utilized or adapted to arrive at additional variations that do not necessarily include all features disclosed herein.

In this detailed description, reference has been made to multiple embodiments of the invention and non-limiting examples and drawings relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are incorporated herein by reference in their entirety as if each publication, patent, or patent application was specifically and individually put forth herein. This specification hereby incorporates by reference commonly owned U.S. Pat. No. 9,925,476, issued Mar. 27, 2018, and U.S. Pat. No. 9,925,477, issued Mar. 27, 2018, and U.S. patent application Ser. No. 15/711,699 filed Sep. 21, 2017 (published on Feb. 1, 2018 as U.S. Patent App. Pub. No. 2018/0028934 A1).

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process, when possible, as well as performed sequentially.

Therefore, to the extent that there are variations of the invention which are within the spirit of the disclosure or equivalent to the inventions found in the appended claims, it is the intent that this patent will cover those variations as well. The present invention shall only be limited by what is claimed.

The present invention is not a single vapor-processing unit for a single process stage, wherein the single vapor-processing unit has one, uninterrupted compression stream with no branches to other process stages or other processes.

What is claimed is:

1. A method for electrifying, decarbonizing, and reducing energy requirements in a refinery, wherein said method comprises introducing multiple vapor compression sub-systems within said refinery, wherein said multiple vapor compression sub-systems comprise multiple mechanical compressors, thermal compressors, and/or vapor jets, and wherein said refinery comprises multiple vapor-processing units that are energy-integrated with said multiple vapor compression sub-systems such that (a) a first vapor stream from a first vapor-processing unit is compressed using a first vapor compression sub-system to generate a compressed first vapor stream; (b) said compressed first vapor stream is condensed to generate a first amount of condensation heat (c) said first amount of condensation heat is heat-exchanged with a second vapor-processing unit within said refinery; (d) a second vapor stream from a second vapor-processing unit is compressed using a second vapor compression sub-system to generate a compressed second vapor stream; (e) said compressed second vapor stream is condensed to generate a second amount of condensation heat and (f) said second amount of condensation heat is heat-exchanged with said first vapor-processing unit and/or with at least one distinct unit, within said refinery, that is not said first vapor-processing unit or said second vapor-processing unit.

2. The method of claim 1, wherein said multiple vapor compression sub-systems include at least three vapor compression sub-systems.

3. The method of claim 1, wherein said multiple vapor compression sub-systems include a mechanical vapor recompression unit.

4. The method of claim 1, wherein said multiple vapor compression sub-systems include a thermal vapor recompression unit.

5. The method of claim 1, wherein at least one of said vapor-processing units is a distillation unit.

6. The method of claim 1, wherein at least one of said vapor-processing units is a stripping unit.

7. The method of claim 1, wherein at least one of said vapor-processing units is an evaporator.

8. The method of claim 1, wherein at least one of said vapor-processing units is a multiple-effect evaporator.

9. The method of claim 1, wherein at least one of said vapor-processing units is a molecular-sieve unit.

10. The method of claim 1, wherein at least one of said vapor-processing units is a chemical reactor.

11. The method of claim 10, wherein said chemical reactor is configured for a chemical reaction selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclization, coking, catalyst regeneration, and combinations thereof.

12. The method of claim 1, wherein cascaded heat to or from said multiple vapor-processing units is integrated with at least one distinct unit within said refinery, and wherein compressed process vapors and optionally generated steam are returned to said first vapor-processing unit.

13. The method of claim 1, wherein at least one of said multiple compressors, thermal compressors, and/or vapor jets is configured to cascade heat to or from a refinery unit that carries out a chemical reaction.

14. The method of claim 13, wherein said chemical reaction is selected from the group consisting of oxidation, reduction, hydrolysis, condensation, transesterification, oligomerization, polymerization, crystallization, isomerization, reforming, cracking, dehydrosulfurization, hydrotreating, alkylation, hydrogenation, dehydrogenation, dehydration (olefin formation), cyclization, coking, catalyst regeneration, and combinations thereof.

15. The method of claim 1, wherein at least one of said multiple mechanical compressors, thermal compressors, and/or vapor jets is configured to cascade heat to or from a refinery unit that carries out a thermal separation.

16. The method of claim 1, wherein at least one of said multiple mechanical compressors, thermal compressors, and/or vapor jets is configured to cascade heat to or from a refinery unit that carries out a fuel or chemical storage operation.

17. The method of claim 1, wherein at least one of said vapor-processing units is configured to process a vapor comprising a refinery intermediate or product, and wherein at least one of said vapor compression sub-systems is configured to compress a heat-exchange medium that is out-of-contact with said vapor.

18. The method of claim 1, wherein said refinery is selected from the group consisting of biorefineries, petroleum refineries, petrochemical plants, natural gas refineries, shale oil refineries, coal-derived product refineries, and syngas-derived product plants.

* * * * *